United States Patent [19]
Mizutani

[11] Patent Number: 5,703,419
[45] Date of Patent: Dec. 30, 1997

[54] STEPPER MOTOR WITH SHORTENED AXIAL LENGTH

[75] Inventor: Takashi Mizutani, Yokkaichi, Japan

[73] Assignee: Nippondenso Co., Ltd., Kariya, Japan

[21] Appl. No.: 627,096

[22] Filed: Apr. 3, 1996

[30] Foreign Application Priority Data

Apr. 27, 1995 [JP] Japan ................... 7-104336

[51] Int. Cl.[6] .................. H02K 37/12; H02K 21/08
[52] U.S. Cl. .................. 310/49 R; 310/156; 310/49 A
[58] Field of Search ................. 310/49 R, 49 A, 310/156

[56] References Cited

U.S. PATENT DOCUMENTS

| | | | |
|---|---|---|---|
| 3,790,889 | 2/1974 | Mincuzzi | 310/156 |
| 4,952,859 | 8/1990 | Torisawa et al. | 310/49 R |
| 5,384,506 | 1/1995 | Aoshima | 310/49 R |

FOREIGN PATENT DOCUMENTS

| | | | |
|---|---|---|---|
| 6-209555 | 7/1926 | Japan | H02K 37/14 |
| 63-074071 | 5/1988 | Japan | H02K 37/12 |
| 6-050942 | 6/1994 | Japan | H02K 37/20 |
| 2248728 | 4/1992 | United Kingdom | 310/49 R |

*Primary Examiner*—Thomas M. Dougherty
*Assistant Examiner*—B. Mullins
*Attorney, Agent, or Firm*—Cushman, Darby & Cushman IP Group of Pillsbury Madison & Sutro LLP

[57] ABSTRACT

A stepper motor comprises a rotor assembly, two bobbin assemblies and two stator assemblies. The stator assemblies are located to sandwich the rotor assembly radially therebetween. Each stator assembly includes upper and lower yokes, columnar cores and a bobbin assembly.

14 Claims, 6 Drawing Sheets

ELECTRIC ANGLE (DEGREE)

STEPPER MOTOR WITH SHORTENED AXIAL LENGTH

BACKGROUND OF THE INVENTION

1. Field of the Invention

The present invention relates to a stepper motor having a shortened axial length and suitable for use, for example, as a driving source for indicators of vehicles or other indicating instruments.

2. Description of Related art

It is desired that stepper motors used in indicating devices of vehicles are as thin as possible for installation in a limited space.

JP 63-74071(U) discloses such a stepper motor. In this motor, a base plate rotatably supports a rotary shaft in an axial direction and the top end of the rotary shaft coaxially supports a plate-like magnet rotor. The base plate also supports, around the rotary shaft, columnar stator cores with respective coils thereon such that the stator cores axially face magnets of the magnet rotor.

According to this stepper motor construction, because the magnet rotor is located to face each stator core axially, the thickness (the axial length) of the stepper motor becomes thicker by an amount of the plate thickness of the magnet rotor. As a result, the stepper motor requires more installation space corresponding to the plate thickness of the magnet rotor, disabling space saving in stepper motor installation.

SUMMARY OF THE INVENTION

It is an object of the present invention to overcome the drawback of the conventional stepper motor.

It is a further object of the invention to provide a stepper motor which is thin and has an improved arrangement of a stator relative to a magnet rotor.

According to the present invention, a plurality of stator cores with respective coils thereon are disposed around a magnet rotor in axially parallel relation with the magnet rotor, and a plurality of magnetic pole teeth, which form magnetic circuits with the stator cores, is disposed to radially face magnetic poles of the magnet rotor. This arrangement between the magnet rotor and the magnetic teeth shortens the axial distance of the stepper motor.

Preferably, a casing plate is divided into two, and the stator cores are fixed to one half and the other half of the casing plate, respectively, in such a manner that the coils on the stator cores of the one half casing plate and the coils on the stator cores of the other half casing plate constitute opposite electrical energization phases to each other. This arrangement between the coils enables smooth rotation of the magnet rotor, while keeping the stepper motor configuration thin.

BRIEF DESCRIPTION OF THE DRAWINGS

Other constructional and operational features of the present invention will become more apparent from the following description when read with reference to the accompanying drawings, in which.

DETAILED DESCRIPTION OF PRESENTLY PREFERRED EMBODIMENTS

The present invention will be described in more detail with reference to a presently preferred exemplary embodiment in which it is applied to an indicator device for vehicles.

Figure 1:
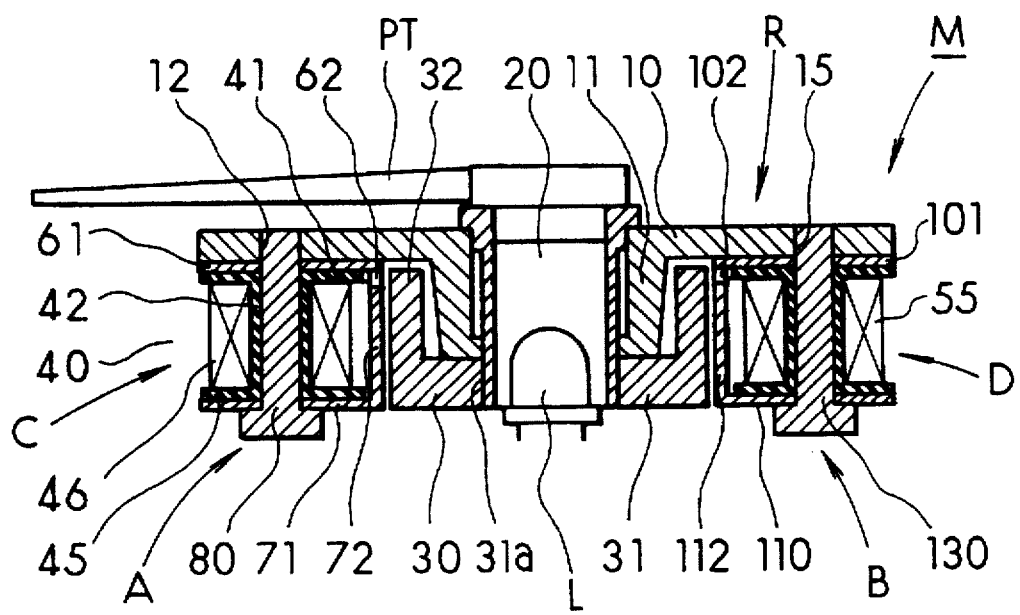
FIG. 1 is a sectional view showing a major part of a stepper motor according to an embodiment of the invention.
Figure 5:
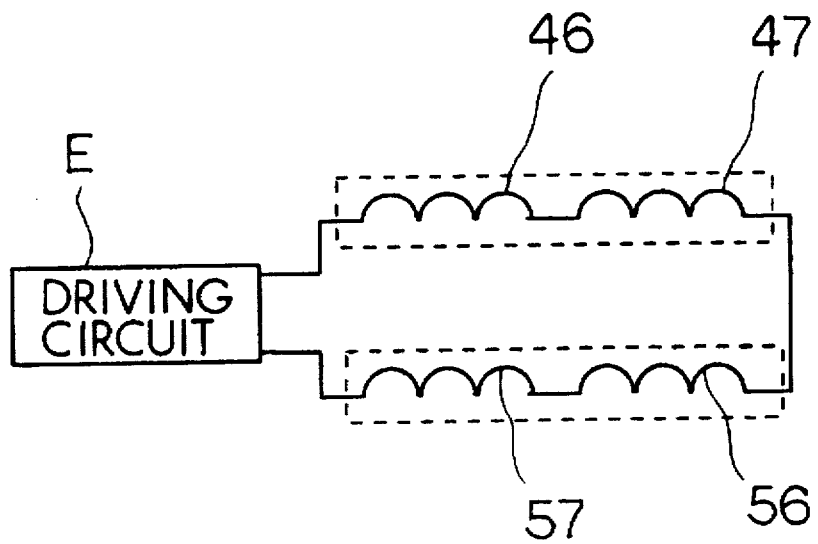
FIG. 5 is an electric wiring diagram of connection of coils shown in FIG. 2.

The indicator device includes, as shown in FIG. 1, a stepper motor M of permanent magnet type, a pointer PT, illumination light source L and an electric driving circuit E (FIG. 5). The stepper motor M comprises a rotor assembly R, two bobbin assemblies C, D, and two stator assemblies A, B.

As shown in FIGS. 1 through 4, the rotor assembly R has a square-shaped casing plate 10 made of nonmagnetic material and is formed at the central part thereof with an annular boss 11 having two bearing parts 11a, 11b (FIG. 2) at the axial ends thereof. A hollow rotary shaft 20 is rotatably supported by the bearing parts 11a, 11b in coaxial relation to the boss 11.

A magnet rotor 30 is formed in U-shape in cross section to have a peripheral wall 32 and a bottom wall 31 with a hole part 31a. The rotary shaft 20 snugly fits into the hole part 31a to be coaxial with the magnet rotor 30 and turn integrally therewith. The peripheral wall 32 of the magnet rotor 30 is located coaxially with the boss 11 of the casing plate 10, and magnetized in N-pole and S-pole alternately in a circumferential direction at the outer periphery thereof.

Figure 2:
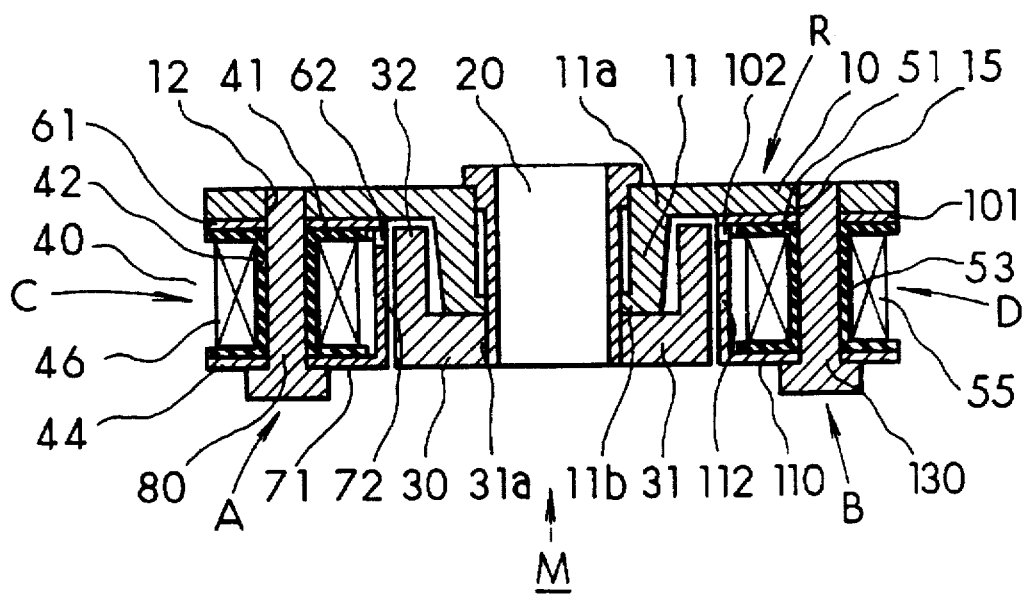
FIG. 2 is another sectional view of the stepper motor shown in FIG. 1.
Figure 3:
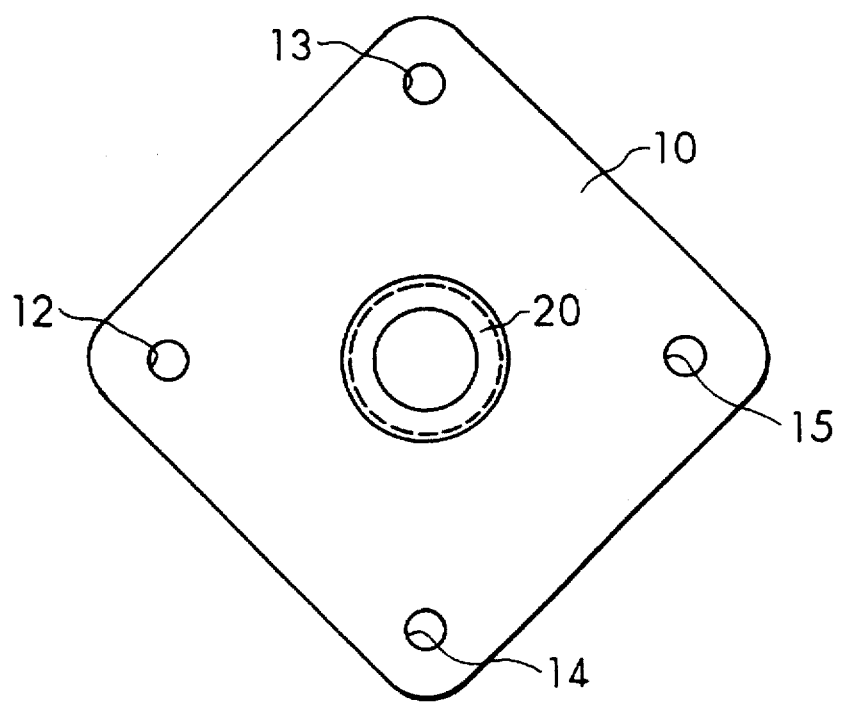
FIG. 3 is a plan view of a square-shaped casing plate shown in FIG. 2.
Figure 4:
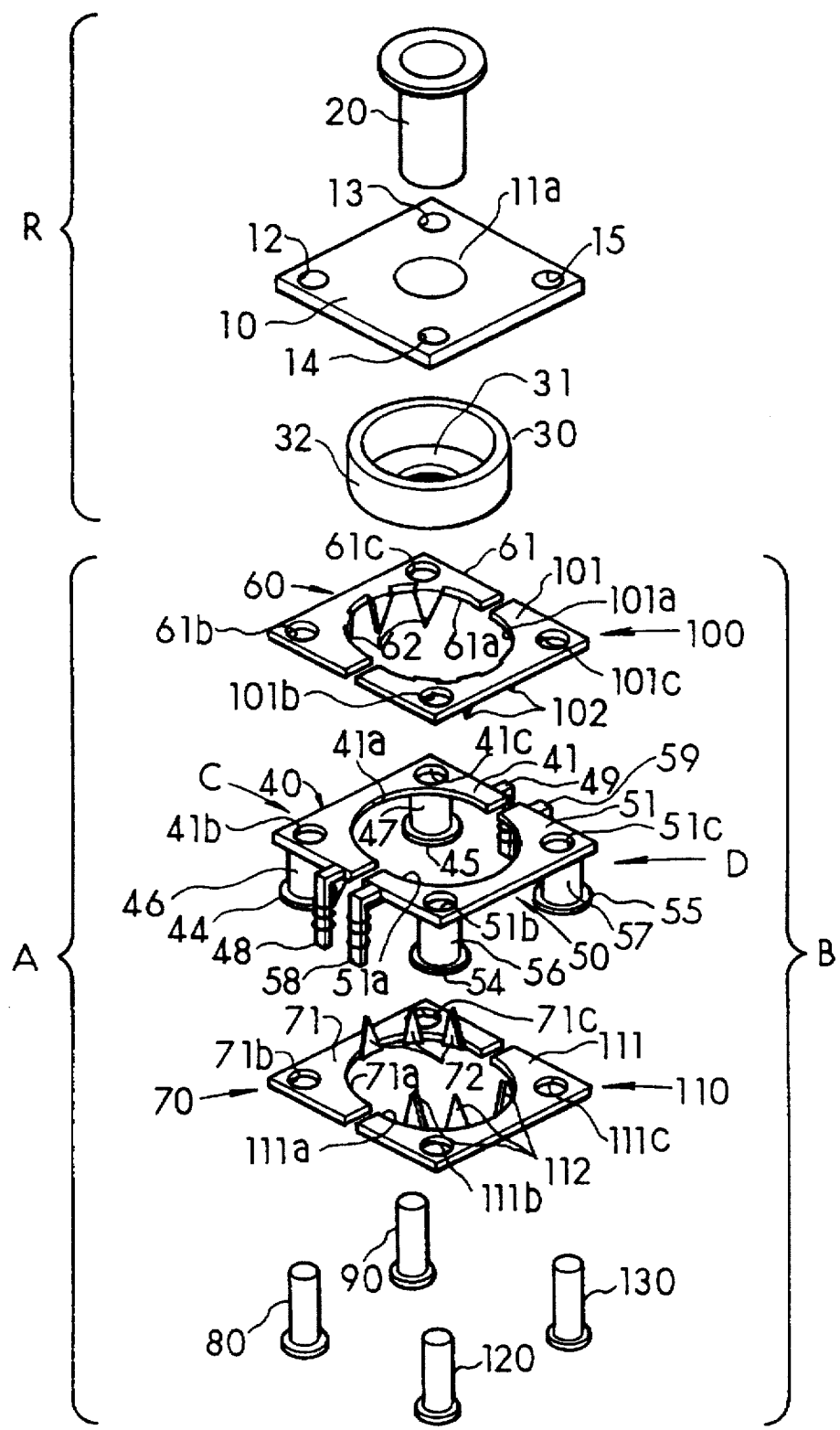
FIG. 4 is an exploded view of component parts of the stepper motor shown in FIG. 2.

As shown in FIGS. 1, 2 and 4, the bobbin assemblies C, D have a symmetrical construction to each other. The bobbin assembly C has a bobbin 40 integrally formed by an electrically insulating resin material. The bobbin 40 comprises a rectangular holding wall 41, tubular extensions 42, 43 (only one is shown in FIG. 2) extending axially from corners of the holding wall 41, and ring-shaped holding wall 44, 45 formed at the axial ends of the extensions 42, 43.

The holding wall 41 is formed with a semicircular opening 41a and, at the corners thereof, with insertion holes 41b, 41c coaxially with the tubular extensions 42, 43. Coils 46, 47 in the same winding turns are wound on the tubular extensions 42, 43, respectively.

The bobbin assembly D, on the contrary, has a bobbin 50 integrally formed by an electrically insulating resin material. The bobbin 50 comprises a rectangular holding wall 51, which constitutes a square-shaped wall together with the holding wall 41, tubular extensions 52, 53 (only one is shown in FIG. 2) extending axially from corners of the holding wall 51, and ring-shaped holding wall 54, 55 formed at the axial ends of the extensions 52, 53.

The holding wall 51 is formed with a semicircular opening 51a, which constitutes a generally circular opening together with the semicircular opening 41a, and at the corners thereof with insertion holes 51b, 51c coaxially with the tubular extensions 52, 53. Coils 56, 57 in the same winding turns are wound on the tubular extensions 52, 53, respectively.

The holding wall 41 has, as shown in FIG. 4, a pair of L-shaped electrical terminals 48, 49 in a manner to face each other. The winding ends of the coils 46, 47 are wound on the terminals 48, 49, respectively. The holding wall 51 has, in the similar manner, a pair of L-shaped electrical terminals 58, 59 in a manner to face each other. The winding ends of the coils 56, 57 are wound on the terminals 58, 59, respectively.

As shown in FIG. 5, the coils 46, 47 are connected in series to each other and constitute one phase of the dual energization phases of the stepper motor M, while the coils 56, 57 are connected in series to each other and constitute the other phase of the dual energization phases of the stepper motor M.

The stator assembly A comprises, as shown in FIGS. 1, 2 and 4, upper and lower yokes 60, 70, columnar stator cores 80, 90, and the bobbin assembly C.

The upper yoke 60 has a rectangular yoke wall 61 which is formed with a semicircular opening 61a coaxially corresponding to the semicircular opening 41a of the holding wall 41. The yoke wall 61 has at the corners thereof insertion holes 61b, 61c formed in coaxial relation with the tubular extensions 42, 43.

From the inner circular periphery of the opening 61a of the yoke wall 61, a plurality of triangular magnetic pole teeth 62 extend axially (downwardly in FIG. 4). The teeth 62, four in number, are arranged circumferentially with a uniform pitch P therebetween.

The lower yoke 70 has, on the contrary, a rectangular yoke wall 71 which is formed with a semicircular opening 71a coaxially corresponding to the semicircular opening 41a of the holding wall 41. The yoke wall 71 has at the corners thereof insertion holes 71b, 71c formed in coaxial relation with the tubular extensions 42, 43.

From the inner circular periphery of the opening 71a of the yoke wall 71, a plurality of triangular magnetic pole teeth 72 extends axially (upwardly in FIG. 4). The teeth 72, four in number, are arranged circumferentially with a uniform pitch P therebetween. The teeth 62, 72 are displaced apart a half pitch, (½)P, in the circumferential direction.

In assembling the stator assembly A, the yoke wall 61 is directly mounted onto the holding wall 41 with the ring-shaped holding wall 44, 45 being placed in position onto the insertion holes 71b, 71c of the yoke wall 71. Then, the core 80 is press-inserted into the insertion hole 61b of the yoke 60 through the insertion hole 71b of the yoke wall 71, holding wall 44, tubular extension 46 and insertion hole 41b of the holding wall 40, while the core 90 is press-inserted into the insertion hole 61c of the yoke 60 through the insertion hole 71c of the yoke wall 71, holding wall 45, tubular extension 47 and insertion hole 41c of the holding wall 40. In this assembly, cores 80, 90 are press-inserted at the top end thereof into the insertion holes 12, 13 of the casing plate 10, respectively. Thus, the stator assembly A is constructed as shown in FIGS. 1 and 2.

The stator assembly B comprises, as shown in FIGS. 1, 2 and 4, upper and lower yokes 100, 110, columnar stator cores 120, 130, and the bobbin assembly D.

The upper yoke 100 has a rectangular yoke wall 101, which forms a square shape together with the rectangular yoke wall 61 and is formed with a semicircular opening 101a coaxially corresponding to the semicircular opening 51a of the holding wall 51. The yoke wall 101 has at the corners thereof insertion holes 101b, 101c formed in coaxial relation with the tubular extensions 52, 53.

From the inner circular periphery of the opening 101a of the yoke wall 101, a plurality of triangular magnetic pole teeth 102 extends axially (downwardly in FIG. 4). The teeth 102, four in number, are arranged circumferentially with a uniform pitch P therebetween.

The lower yoke 110 has, on the contrary, a rectangular yoke wall 111, which forms a square together with the rectangular yoke wall 71 and is formed with a semicircular opening 111a coaxially corresponding to the semicircular opening 51a of the holding wall 51. The yoke wall 111 has at the corners thereof insertion holes 111b, 111c formed in coaxial relation with the tubular extensions 52, 53.

From the inner circular periphery of the opening 111a of the yoke wall 111, a plurality of triangular magnetic pole teeth 112 extends axially (upwardly in FIG. 4). The teeth 112, four in number, is arranged circumferentially with a uniform pitch (step angle) P therebetween. The teeth 102, 112 are displaced apart a half pitch, (½)P, in the circumferential direction.

In assembling the stator assembly B, the yoke wall 101 is directly mounted onto the holding wall 51 with the ring-shaped holding wall 54, 55 being placed in position onto the insertion holes 111b, 111c of the yoke wall 111. Then, the core 120 is press-inserted into the insertion hole 101b of the yoke 101 through the insertion hole 111b of the yoke wall 111, holding wall 54, tubular extension 56 and insertion hole 51b of the holding wall 51, while the core 130 is press-inserted into the insertion hole 101c of the yoke 101 through the insertion hole 111c of the yoke wall 111, holding wall 55, tubular extension 57 and insertion hole 51c of the holding wall 51. In this assembling, cores 120, 130 are press-inserted at the top ends thereof into the insertion holes 14, 15 of the casing plate 10, respectively. Thus, the stator assembly B is constructed as shown in FIGS. 1 and 2. The magnetic pole teeth 102, 112 are displaced apart a quarter pitch, (¼)P, in the circumferential direction.

Although it is shown in FIGS. 1 and 2 that the upper yokes 60 and 100 are placed on the same horizontal plane (same axial position) and the lower yokes 70, 110 are placed on the same horizontal plane, it needs not be so as long as the stator assemblies A, B face the rotor assembly R at least partly.

As shown in FIG. 1, the pointer PT is fixed at the base portion thereof to the top end of the rotary shaft 20 and the light source L is housed within the bottom end part of the same. Thus, the pointer PT receives the illumination light from the light source L through the hollow portion in the rotary shaft 20 and radiate from its light transmitting portion.

Figure 6:
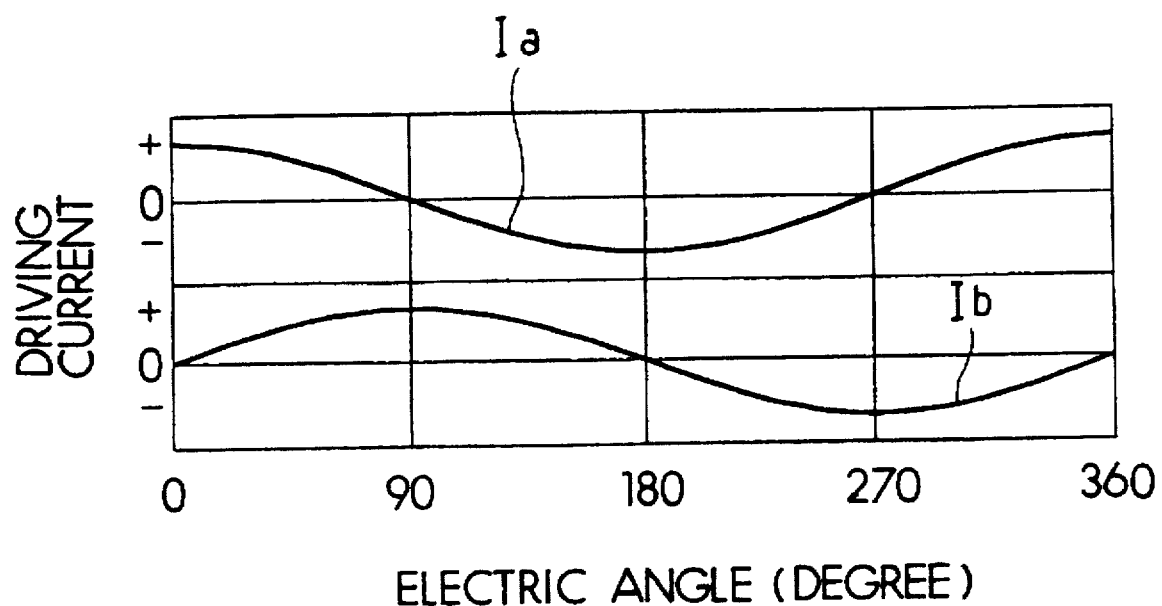
FIG. 6 is a waveform chart of electric output currents of a driving circuit shown in FIG. 5.

The driving circuit E, as shown in FIGS. 5 and 6, supplies the series-connected coils 46, 47 with a sinusoidal electric current Ia and the series-connected coils 56, 57 with a sinusoidal electric current Ib. The electric currents Ia, Ib are in electrically 90 degrees out-of-phase.

Figure 7A:
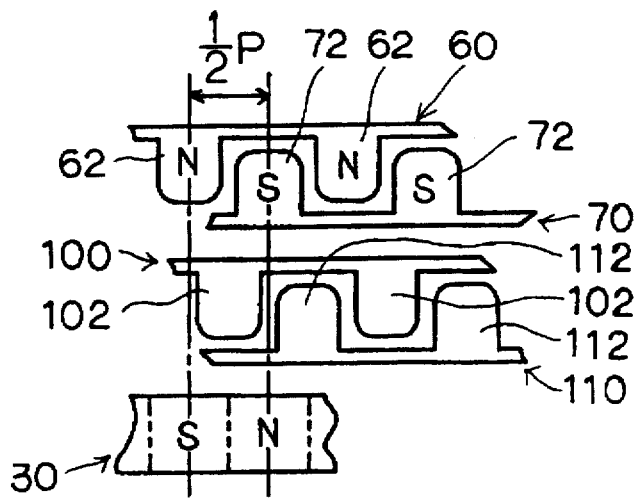
FIGS. 7A–7D are schematic views of operational modes of the stepper motor shown in FIG. 2.

In the stepper motor constructed as described above, the magnetic pole teeth of yokes 60, 70 are magnetized in the polarities shown in FIG. 7A, for instance, with the driving circuit E energizing the coils 46, 47 by the driving current Ia in the positive polarity region. Thus, the magnetic pole teeth 62, 72, which are spaced a half (½) pitch apart from each other, are magnetized into N-pole, S-pole, respectively, with the magnetic flux flowing generally axially. The magnet rotor 30 stably stops turning and held in position as shown in FIG. 7A, with its adjacent magnetic poles (S-pole, N-pole) being attracted by the magnetic pole teeth 62 (N-pole), 72 (S-pole) radially, respectively.

Figure 7B:
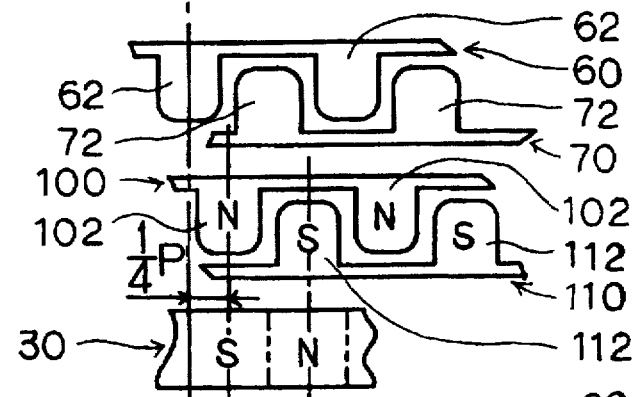

The magnetic pole teeth of yokes 100, 110 are magnetized in the polarities shown in FIG. 7B, with the driving circuit E energizing the coils 56, 57 by the driving current Ib in the positive polarity region. Thus, the magnetic pole teeth 102, 112, which are spaced a half pitch apart from each other are magnetized into N-pole, S-pole, respectively. Because the magnetic pole teeth of the stator assembly A are spaced a quarter (¼) pitch apart relative to those of the stator assembly B, the magnet rotor 30 turns a quarter (¼) pitch with its magnetic poles being attracted to the magnetic pole teeth of the stator assembly B and stops.

Figure 7C:
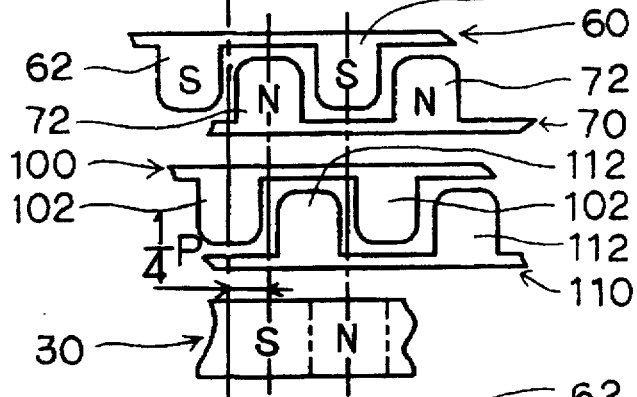

The magnetic pole teeth of yokes 60, 70 are magnetized in the polarities shown in FIG. 7C, with the driving circuit E energizing the coils 46, 47 by the driving current Ia in the negative polarity region. Thus, the magnetic pole teeth 62, 72, which are spaced a half (½) pitch apart from each other are magnetized into S-pole, N-pole, respectively. In this instance, the magnet rotor 30 turns a quarter (¼) pitch with its magnetic poles being attracted to the magnetic pole teeth 62 (S-pole), 72 (N-pole) and stops.

Figure 7D:
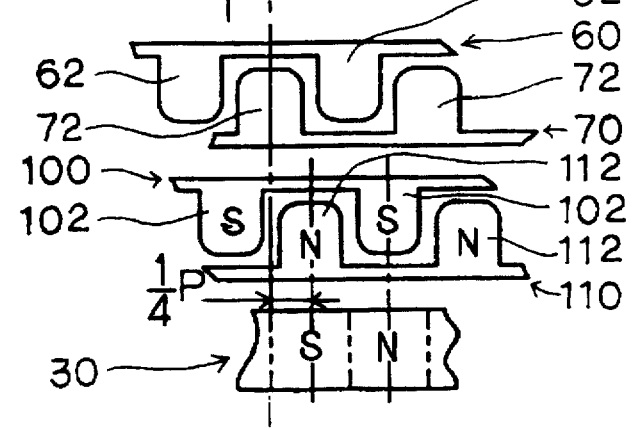

The magnetic pole teeth of yokes 100, 110 are magnetized in the polarities shown in FIG. 7D, with the driving circuit E energizing the coils 56, 57 by the driving current Ib in the negative polarity region. Thus, the magnetic pole teeth 102, 112, which are spaced a half (½) pitch apart from each other are magnetized into S-pole, N-pole, respectively. Because the magnetic pole teeth of the stator assembly A are spaced a quarter (¼) pitch apart relative to those of the stator assembly B, the magnet rotor 30 turns a quarter (¼) pitch with its magnetic poles being attracted to the pole teeth of the stator assembly B and stops.

By the repetition of the above described process in sequence, each magnetic pole teeth which are spaced a quarter (¼) pitch apart is magnetized into the same magnetic polarity in order from the yoke 60 to the yoke 110 through the yokes 100 and 70. As a result, the stepper motor M turns quarter pitch by quarter pitch to turn the pointer PT correspondingly.

In the case of magnetizing the yokes 60, 100, 70, 110 in the opposite order, the magnet rotor 30 will turn quarter pitch by quarter pitch in the opposite turn direction.

It is to be noted in the foregoing embodiment that the stator assemblies A, B are located at one half side and the other half side underside the casing plate 10 with four stator cores being located radially outside the magnet rotor, i.e., the stator core axes being in parallel with the rotary axis of the magnet rotor. Further, the stator assemblies A, B sandwiches the magnet rotor 30 radially therebetween with the magnetic pole teeth thereof facing magnetic poles of the magnet rotor 30 on the circumferential plane surrounding the rotary shaft 20 as a central axis. Thus, the stepper motor is shortened in its axial length and made thinner, resulting in reduction of space required for installation with the instrument device into vehicle instrument panels.

Because the casing plate 10 is formed into the square-shape, the cores of the stator assemblies A, B can be located at the corners of the casing plates 10. Thus, the configurational size of the casing plate 10 can be reduced to the necessary minimum to further enhance the reduction in the required installation space.

Further, by the use of the arrangement that the stator assemblies A, B locate in one half space and the other half space underside the casing plate 10 to sandwich the magnet rotor 30, the coils on the cores in the one half space and on the cores in the other half space are energized in different energizing phases. As a result, driving the stepper motor for smooth rotation can be realized, while assuring the thin configuration of the stepper motor.

In addition, by forming each magnetic flux in the axial direction of the magnet rotor to provide the rotating magnetic field which rotates the magnet rotor, the number of the magnetic pole teeth facing the magnet rotor can be increased with ease to provide the rotating magnetic field among the pole teeth. Therefore, the step angle of the stepper motor can be decreased, enabling fine step rotation.

Figure 8:
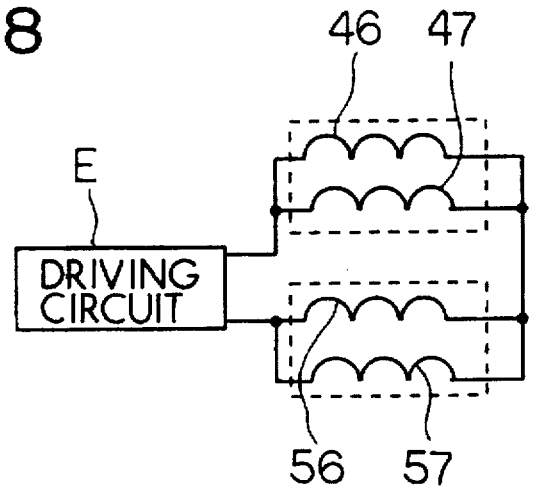
FIG. 8 is an electric wiring diagram of a modification of connection of coils shown in FIG. 2.

As a modification of the above described embodiment, as shown in FIG. 8, the driving circuit E may energize the coils 46, 47, 56, 57 (connected as shown) sequentially. In this case, the coils 46, 47 constitute the one electrical energization phase, while the coils 56, 57 constitute the other phase.

Figure 9:
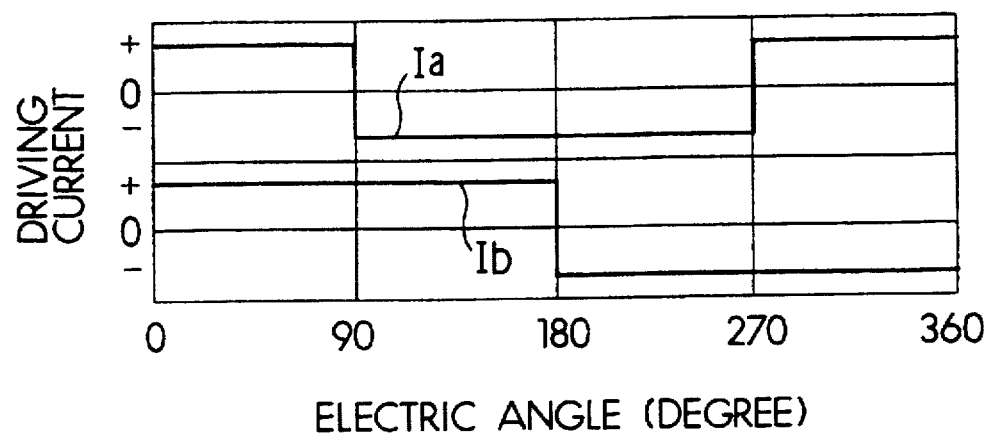
FIG. 9 is a waveform chart of a modification of electric currents of the driving circuit shown in FIG. 5.

Further, the driving circuit E may supply the energization currents Ia, Ib in the rectangular waveform as shown in FIG. 9 in place of the currents in the sinusoidal waveform shown in FIG. 6.

Figure 11:
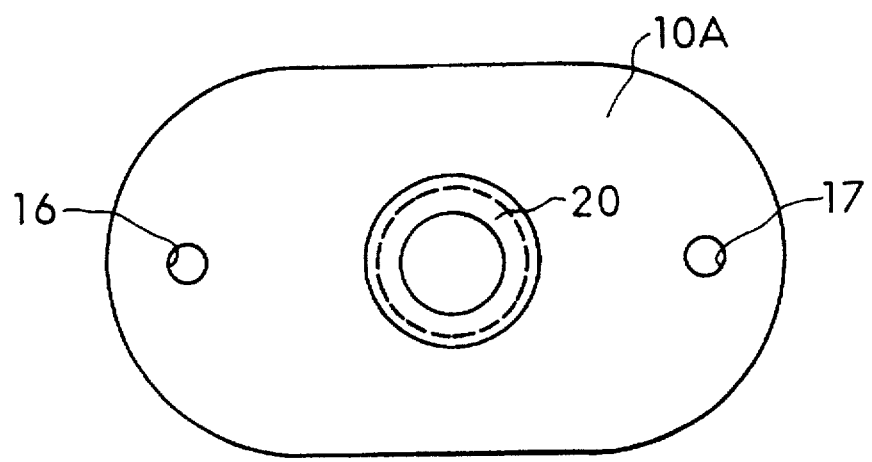
FIG. 11 is a plan view of an elliptical casing plate shown in FIG. 10.
Figure 10:
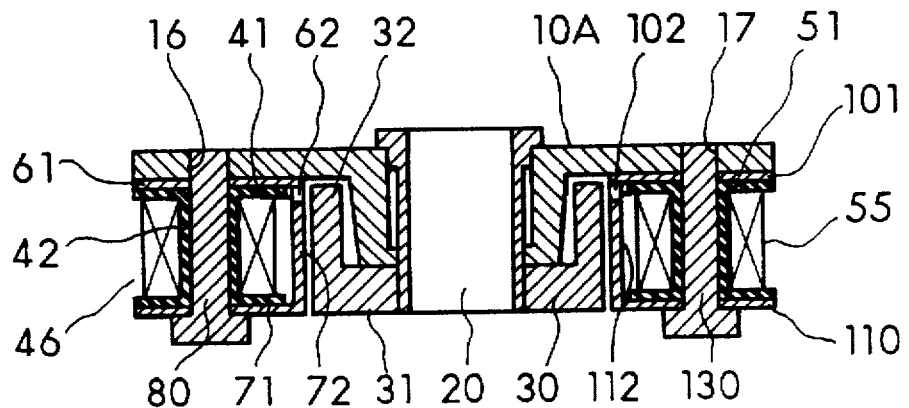
FIG. 10 is a sectional view of a modification of the embodiment.

Still further, the stepper motor may be constructed as shown in FIG. 10. In this construction, the stepper motor uses a casing plate formed in an extended elliptical shape as shown in FIG. 11 in place of the square-shaped casing plate 10 shown in FIG. 3. The casing plate a is assembled with one core unit including the core 80 of the stator assembly A and the one core unit including the core 130 of the stator assembly B. The cores 80, 130 are fitted into insertion holes 16, 17 of the casing plate 10a, respectively.

The coil driving is not limited to the single(1)-phase driving type of the embodiment, but may be the dual(2)-phase driving type, single-dual-phase driving type, or micro step driving type.

The stepper motor is not limited to the magnet type but may be the hybrid type.

Further, the yokes 60, 100, yokes 70, 110 and supports 40, 50 may be formed integrally.

Other alterations and modifications of the embodiment will be made within the spirit and scope of the present invention.

What is claimed is:

1. A stepper motor comprising:
    a cylindrical magnet rotor supported rotatably and having a plurality of magnetic poles arranged on a circumferential periphery in a circumferential direction;
    two pairs of cores wound with respective coils thereon around central axes thereof, the central axes being in parallel with a rotary axis of the magnet rotor; and
    a pair of rectangular stators located along the circumferential periphery of the magnet rotor and having respective openings which face radially each other to receive the magnet rotor therein, each of the stators having first and second pole teeth facing radially the circumferential periphery of the rotor magnet, and each of the stators respectively supporting axial ends of one pair of the cores at angled corners of said stators sandwiching the cores therebetween so that the first and second pole teeth are magnetized in the opposite polarities.

2. A stepper motor according to claim 1, further comprising:
    a pointer fixed to an axial end of the magnet rotor to turn together with the magnet rotor.

3. A stepper motor according to claim 1, further comprising:

a square casing plate fixedly supporting said pair of rectangular stators.

4. A stepper motor according to claim 1, further comprising:

each stator of said pair of rectangular stators respectively formed by a pair of rectangular yokes, a pair of bobbins formed in the same rectangular shape as the rectangular yokes and respectively interposed between said pair of yokes in each stator of said pair of stators, each of said bobbins respectively having a pair of electrical terminals on which winding ends of said coils are wound.

5. A stepper motor comprising:

a magnet rotor rotatably supported and having a plurality of magnetic poles arranged circumferentially on a circumferential surface thereof, each of said magnetic poles being in a single magnetic pole in an axial direction;

a first stator group located in a first space radially adjacent to the magnet rotor and having a first pair of rectangular yokes formed with a semicircular opening and with a pair of angled corners, said first pair of rectangular yokes respectively including first pole teeth and second pole teeth arranged alternately in a circumferential direction to face radially the magnetic poles of the magnet rotor;

a second stator group located in a second space radially adjacent to the magnet rotor and having a second pair of rectangular yokes formed with a semicircular opening and with a pair of angled corners, said second pair of rectangular yokes respectively including third pole teeth and fourth pole teeth arranged alternately in the circumferential direction to face radially the magnetic poles of said magnet rotor;

a first pair of cores located to have central axes thereof different from that of the magnet rotor and wound with a first pair of coils thereon to magnetize the first and second pole teeth of the first stator group into opposite magnetic polarities by magnetic fluxes flowing axially between the first and second pole teeth, said first pair of cores being respectively located at said angled corners of said first pair of rectangular yokes of said first stator group; and a pair of second cores located to have a central axes thereof different from that of the magnet rotor and wound with a second pair of coils thereon to magnetize the third and fourth pole teeth of the second stator group into opposite magnetic polarities by magnetic fluxes flowing axially between the third and fourth pole teeth, said second pair of cores being respectively located at said angled corners of said second pair of rectangular yokes of said second stator group, wherein the first and second pole teeth of the first stator group and the third and fourth pole teeth of the second stator group are spaced a predetermined distance apart from each other, and the first and second stator groups are located to radially face each other.

6. A stepper motor according to claim 5, wherein:

the central axes of the first pair and second pair of cores are located outside the magnet rotor in parallel with the central axis of the magnet rotor.

7. A stepper motor according to claim 5, wherein:

the coils are wound around the central axes of the first pair and second pair of cores, respectively.

8. A stepper motor according to claim 7, wherein:

the first stator group includes as said first pair of rectangular yokes first and second stators having, respectively, the first and second pole teeth;

the second stator group includes as said second pair of rectangular yokes third and fourth stators having, respectively, the third and fourth pole teeth;

the first and second stators support axial ends of the first pair of cores, respectively, to sandwich the same therebetween; and the third and fourth stators support axial ends of the second pair of cores, respectively, to sandwich the same therebetween.

9. A stepper motor according to claim 8, wherein:

the first and third stators are located to radially face each other; and the second and fourth stators are located to radially face each other.

10. A stepper motor according to claim 8, further comprising:

a square-shaped casing plate supporting the magnet rotor rotatably therein, and fixed to the first through fourth stators and first and second pairs of cores.

11. A stepper motor according to claim 10, wherein:

the first and second stators are located at one half side of the casing plate with respect to the magnet rotor; and the third and fourth stators are located at the other half side of the casing plate.

12. A stepper motor according to claim 5, wherein:

the first and second pole teeth of the first stator group are circumferentially spaced apart from the third and fourth pole teeth of the second stator group by a quarter pitch.

13. A stepper motor according to claim 5, wherein:

the first and second stator group constitute different energization phases to generate a rotating magnetic field which rotates the magnet rotor.

14. A stepper motor according to claim 5, further comprising:

a pointer fixed to an axial end of the magnet rotor to turn together with the magnet rotor.

* * * * *